(12) United States Patent
Sugita et al.

(10) Patent No.: US 6,946,553 B2
(45) Date of Patent: Sep. 20, 2005

(54) PROCESS FOR PRODUCING ε-CAPROLACTAM AND CATALYST FOR THE PRODUCTION

(75) Inventors: Keisuke Sugita, Niihama (JP); Tsuyoshi Matsushita, Sendai (JP); Hiroshi Ichihashi, Otsu (JP)

(73) Assignee: Sumitomo Chemical Company, Limited, Osaka (JP)

( * ) Notice: Subject to any disclaimer, the term of this patent is extended or adjusted under 35 U.S.C. 154(b) by 81 days.

(21) Appl. No.: 10/367,701

(22) Filed: Feb. 19, 2003

(65) Prior Publication Data

US 2003/0165425 A1 Sep. 4, 2003

(30) Foreign Application Priority Data

Feb. 27, 2002 (JP) ......................................... 2002-051033
Jun. 21, 2002 (JP) ......................................... 2002-181098

(51) Int. Cl.⁷ ............................................. C07D 201/04
(52) U.S. Cl. ........................................................ 540/536
(58) Field of Search .......................................... 540/536

(56) References Cited

U.S. PATENT DOCUMENTS

| | | | |
|---|---|---|---|
| 5,212,302 A | 5/1993 | Kitamura et al. | 540/536 |
| 5,403,801 A | 4/1995 | Kitamura et al. | 502/86 |
| 5,741,904 A | 4/1998 | Hoelderich et al. | 540/536 |
| 6,071,844 A | 6/2000 | Hoelderich et al. | 507/77 |

FOREIGN PATENT DOCUMENTS

| | | |
|---|---|---|
| EP | 0234088 A2 | 9/1987 |
| EP | 0494535 A1 | 7/1992 |
| EP | 0544531 A1 | 6/1993 |
| EP | 1065167 A1 | 1/2001 |
| JP | 5170732 | 7/1993 |
| JP | 6107627 | 4/1994 |

OTHER PUBLICATIONS

Ichihashi et al., Applied Catalysis A, vol. 221, No. 1–2, pp. 359–366, (2001).

*Primary Examiner*—Bruck Kifle
(74) *Attorney, Agent, or Firm*—Birch, Stewart, Kolasch & Birch, LLP

(57) ABSTRACT

Improved processes for producing an ε-caprolactam using a solid catalyst and for producing a catalyst which can be used in the production of ε-caprolactam are provided. In the present invention, a solid catalyst such as a zeolite is treated with an aqueous solution containing an ammonia and at least one compound selected from the group consisting of quaternary ammonium compounds and lower alkylamines. In accordance with the present invention, a zeolite having a high catalyst activity and a long lifetime is produced, and a solid catalyst which has been used in the production of ε-caprolactam can be re-activated. In the present invention, by using the thus obtained zeolite and/or the thus activated solid catalyst, an ε-caprolactam is produced in a high yield over the long period of time.

26 Claims, No Drawings

PROCESS FOR PRODUCING ε-CAPROLACTAM AND CATALYST FOR THE PRODUCTION

FIELD OF THE INVENTION

The present invention relates to a process for producing an ε-caprolactam in which a cyclohexanone oxime is subjected to a Beckmann rearrangement reaction in a gas phase in the presence of a solid catalyst. Also, the present invention relates to a process for producing a zeolite catalyst useful for the process for producing an ε-caprolactam. Further, the present invention relates to a method for activating a catalyst which has been used in the process for producing an ε-caprolactam.

BACKGROUND OF THE INVENTION

Conventionally, a method that involves subjecting a cyclohexanone oxime to Beckmann rearrangement reaction in a gas phase in the presence of a solid catalyst is proposed as a process for producing an ε-caprolactam (for example, Japanese Patent Application Laid-Open Nos. 2-250866 and 2-275850). This reaction may sometimes have problems such that the catalyst activity is gradually decreased with reaction time due to deposition of carbonaceous material on the catalyst surface, thermal degradation of the catalyst, etc. In order to cope with the problems, methods are proposed in which a solid catalyst for the reaction is treated with an ammonia to re-activate the catalyst (see, Japanese Patent Application Laid-Open No. 5-9180; corresponding to U.S. Pat. Nos. 5,212,302 and 5,403,801) or in which a solid catalyst is treated with an aqueous solution of ammonium salt (such as ammonium chloride, ammonium sulfate and ammonium nitrate) and at least one basic material (such as ammonia, lower alkylamine, alkylamine and alkylammonium hydroxide) to provide high catalyst activity (see, Japanese Patent Application Laid-Open No. 5-170732; corresponding to U.S. Pat. Nos. 5,212,302 and 5,403,801).

SUMMARY OF THE INVENTION

Objects of the present invention are, for example, to provide a solid catalyst having an activity higher than that of conventional catalysts and to provide a process for producing an ε-caprolactam using the solid catalyst in a high yield over a long period of time. Other objects of the invention include providing a process for producing and/or a method for activating the solid catalyst useful for the production of ε-caprolactam.

The present inventors have intensively conducted studies on a catalyst for producing an ε-caprolactam, and have found that the above objects can be achieved by treating a solid catalyst with an aqueous solution containing an ammonia and at least one more specific component, and have accomplished the present invention.

The present invention provides a process for producing an ε-caprolactam, which comprises the steps of:

(i) treating a solid catalyst with an aqueous solution containing an ammonia and at least one compound selected from the group consisting of quaternary ammonium compounds and lower alkylamines, and (ii) subjecting a cyclohexanone oxime to Beckmann rearrangement reaction in a gas phase in the presence of the treated solid catalyst.

Also, the present invention provides a process for producing a zeolite, the process comprising the steps of:

subjecting a silicon compound to hydrothermal synthesis reaction to obtain a crystal;

calcining the crystal; and treating the calcined crystal with an aqueous solution containing an ammonia and at least one compound selected from the group consisting of quaternary ammonium compounds and lower alkylamines, to obtain the zeolite.

Further, the present invention provides a method for activating a solid catalyst which has been used in Beckmann rearrangement reaction of a cyclohexanone oxime in a gas phase, the method comprising the step of treating the solid catalyst with an aqueous solution containing an ammonia and at least one compound selected from the group consisting of quaternary ammonium compounds and lower alkylamines.

DETAILED DESCRIPTION OF THE INVENTION

A catalyst to be used in the present invention is a solid catalyst which can be utilized for producing an ε-caprolactam from an cyclohexanone oxime by Beckmann rearrangement reaction in a gas phase. The catalyst to be treated in the present invention may be a commonly known solid catalyst. Examples of the solid catalysts are a zeolite and a silica-alumina, etc. The solid catalyst to be used in the present invention is preferably a zeolite, is more preferably a pentacil-type zeolite, and is most preferably a MFI zeolite.

The above-described zeolite contains silicon and oxygen as elements constituting its skeletal structure, and may be a crystalline silica that has a skeletal structure substantially consisting of silicon and oxygen, or may be metallosilicate or the like that further contains elements other than silicon and oxygen as elements constituting the skeletal structure. The elements other than sit icon and oxygen contained in the metallosilicate or the like may be Be, B, Al, Ti, V, Cr, Fe, Co, Ni, Cu, Zn, Ga, Ge, Zr, Nb, Sb, La, Hf, Bi and the like. If necessary, two or more kinds of these elements are contained in the metallosilicate. The ratio of the number of silicon atoms to that of these elements is preferably 5 or more, and is more preferably 500 or more.

The zeolite can be suitably prepared by, for example, subjecting a silicon compound, a quaternary ammonium compound, water and an optional metal compound, etc. as raw materials, to hydrothermal synthesis to obtain a crystal, drying and calcining the crystal, contacting the resulting material with an ammonia, an ammonium salt or the like, and then drying the material.

In the production process for ε-caprolactam in the present invention, a catalyst to be treated may be a known zeolite (as described above), or may be a zeolite which is produced in the present invention by the process comprising the steps of:

subjecting a silicon compound to hydrothermal synthesis reaction to obtain a crystal;

calcining the crystal; and treating the calcined crystal with an aqueous solution containing an ammonia and at least one compound selected from the group consisting of quaternary ammonium compounds and lower alkylamines.

In the process for producing a zeolite in the present invention, the hydrothermal synthesis reaction of a silicon compound may be conducted in a known method and is not limited. Preferably, the hydrothermal synthesis reaction is conducted by a method comprising the steps of mixing a silicon compound with water and a quaternary ammonium hydroxide to obtain a mixture thereof and then heating the mixture. Examples of the silicon compound include a tetraalkyl orthosilicate such as a tetramethyl orthosilicate, a tetraethyl orthosilicate, a tetrapropyl orthosilicate and a tetrabutyl orthosilicate. One or more compounds selected from these orthosilicates may be used. When a tetra-n-propylammonium hydroxide is used as a quaternary ammonium hydroxide in the hydrothermal synthesis reaction, a pentacil-type zeolite (especially, a MFI zeolite), which is suitable as a catalyst in the production of ε-caprolactam, may be obtained.

In preparing the mixture for the hydrothermal synthesis reaction, a compound other than a silicon compound, water and a quaternary ammonium hydroxide may be used, if necessary. Examples of such a compound include a basic compound such as a sodium hydroxide and a potassium hydroxide. By using a sodium hydroxide, a potassium hydroxide or the like, a concentration of hydroxide ion in the mixture may be suitably adjusted. Also, in order to adjust a concentration of quaternary ammonium ion (if any) in the mixture, a quaternary ammonium salt such as a quaternary ammonium bromide may be mixed with the mixture. Further, in order to allow the resulting zeolite to have the elements other than silicon and oxygen in its skeletal structure, a compound containing the above-described elements other than an silicon and oxygen may be mixed with the mixture.

In the mixture for the hydrothermal synthesis reaction, a molar ratio of each component to silicon may be controlled as follows: the molar ratio of water to silicon may be about 5 to about 100, and is preferably about 10 to about 60, the molar ratio of quaternary ammonium ion to silicon may be about 0.1 to about 0.6, and is preferably 0.2 to about 0.5, the molar ratio of hydroxide ion to silicon may be about 0.1 to about 0.6, and is preferably 0.2 to about 0.5. When a compound containing the elements other than an silicon and oxygen may be mixed with the mixture, the molar ratio of silicon to the elements is preferably 5 or more, and is more preferably 500 or more, as described above.

The hydrothermal synthesis reaction maybe conducted under a temperature of from about 80° C. to about 160° C. for about 1 hour to about 200 hours.

After the hydrothermal synthesis reaction, a crystal obtained from the reaction may be separated from the hydrothermal synthesis reaction mixture by a known procedure such as concentration, filtration and the like. The crystal is dried if necessary and then may be calcined. The calcination may be conducted at a temperature of from about 400° C. to about 600° C. under the atmosphere of an oxygen-containing gas such as an air and a mixture gas of a nitrogen with an air.

In the present invention, the calcined crystal thus obtained by hydrothermal synthesis reaction of a silicon compound, followed by calcination, may be treated with an aqueous solution containing an ammonia and at least one compound selected from the group consisting of quaternary ammonium compounds and lower alkylamines. By the treatment with the aqueous solution containing an ammonia and the like, a zeolite with improved lifetime as a catalyst can be produced. The treatment is conducted in the same manner as described in detail below for activating a solid catalyst used in Beckmann rearrangement reaction of cyclohexanone oxime. If necessary, an optional treatment (such as treatment with steam) may be conducted for the above calcined crystal prior to the treatment with the aqueous solution. For example, the treatment with steam provides the resulting zeolite with improved strength as crystal.

The zeolite thus obtained in the present invention can be utilized in a variety of usage such as a catalyst for organic synthesis, and is preferably used as a catalyst for Beckmann rearrangement reaction of cyclohexanone oxime in a gas phase to produce an ε-caprolactam.

The solid catalyst to be treated and/or produced in the present invention preferably has a particle diameter of from about 0.001 mm to about 5 mm, and more preferably has a particle diameter of from about 0.02 mm to about 3 mm. The solid catalyst may be, for example, a molded article substantially consisting of catalyst components, or may be a carrier supporting a catalyst component therein.

In the present invention, a cyclohexanone oxime may be subjected to Beckmann rearrangement reaction using the aforementioned solid catalyst in a gas phase at a temperature of from about 250° C. to about 500° C., preferably at a temperature of from about 300° C. to about 450° C., under a pressure of from about 0.005 MPa to about 0.5 MPa, preferably under a pressure of from 0.005 MPa to 0.2 MPa. The reaction may be performed in a fixed-bed processor in a fluidized-bed process. The supply rate of the raw material cyclohexanone oxime may be, in terms of the supply rate (kg/h) of catalyst per kilogram, i.e., space velocity WHSV ($h^{-1}$), in the range of from about 0.1 $h^{-1}$ to about 20 $h^{-1}$, and is preferably in the range of from about 0.2 $h^{-1}$ to about 10 $h^{-1}$.

The Beckmann rearrangement reaction is preferably performed in the presence of alcohol from the viewpoint of improving conversion of cyclohexanone oxime and/or selectivity to ε-caprolactam. The alcohol to be used may be an alcohol having 1 to 8 carbon atoms, and is preferably an alcohol having 1 to 6 carbon atoms. Examples of the alcohol include a methanol, an ethanol, a 1-propanol, a 2-propanol, a 1-butanol, a 1-methyl-1-propanol, a 2-methyl-1-propanol, a 1-pentanol, a 1-hexanol and the like. Among these alcohols, a methanol and an ethanol are preferred. If necessary, two or more kinds of alcohols can be used. The amount of alcohol to be used may be in the range of from about 10 parts by weight to about 2,000 parts by weight, and is preferably in the range of from about 20 parts by weight to about 1,000 parts by weight, based on 100 parts by weight of cyclohexanone oxime.

In addition, the Beckmann rearrangement reaction may be carried out in the presence of water. In this case, the amount of water to be used is preferably about 2.5 mol or less based on one (1) mol of cyclohexanone oxime. Furthermore, the above reaction may be performed in the presence of an inert gas. The inert gases include, for example, a nitrogen, an argon and a carbon dioxide.

The reaction mixture obtained after the above-mentioned Beckmann rearrangement reaction may be subjected to a post-treatment, if necessary, in accordance with a known method. For example, the reaction mixture gas may be cooled and be condensed, followed by an operation such as extraction, distillation, crystallization, etc., to separate an ε-caprolactam therein.

As the Beckmann rearrangement reaction of cyclohexanone oxime in a gas phase in the presence of a solid catalyst is continued, the activity of the solid catalyst may be gradually deteriorated and thus conversion of the cyclohexanone oxime may be lowered due to deposition of carbonaceous materials on the catalyst surface, thermal degradation of the catalyst and the like. In the present invention, such a solid catalyst used in the Beckmann rearrangement reaction can be activated by the treatment with an aqueous solution containing an ammonia and at least one compound selected from the group consisting of quaternary ammonium compounds and lower alkylamines. Preferably, the activation treatment is conducted using an aqueous solution containing an ammonia and a quaternary ammonium compound. The activation treatment re-activates the deteriorated catalyst, which provides a catalyst with activity equivalent to or more than that of a brand-new catalyst. As described above, such a treatment with an aqueous solution containing an ammonia and the like may be conducted in the process for producing a zeolite, which is also within the present invention.

The activation treatment in the present invention using an aqueous solution containing an ammonia and a quaternary ammonium compound/lower alkylamine provides advantages which are hardly attained by those by a treatment with a similar aqueous solution such as a solution containing an ammonia and an ammonium compound other than a quaternary ammonium compound. For example, a solid catalyst treated and/or produced in the present invention produce an ε-caprolactam in a higher yield over the longer period of time. The activation treatment in the present invention may be repeatedly conducted several times, and/or may be conducted in combination with the treatment using a known similar aqueous solution for catalyst treatment, if necessary.

Examples of the quaternary ammonium compounds to be used in the above-described activation treatment include hydroxides, halides, etc. of a variety of quaternary ammonium such as a tetramethylammonium, a tetraethylammonium, a n-propyltrimethylammonium, a tetra-n-propylammonium, a tetra-n-butylammonium, a 4,4'-trimethylenebis(dimethylpiperidium), a benzyltrimethylammonium, a dibenzyldimethylammonium, a 1,1'-butylenebis(4-aza-1-azoniabicyclo[2,2,2]octane) and a trimethyladamantylammonium. Two or more of these quaternary ammonium compounds can be used together, if necessary. Among them, a quaternary ammonium halide and a tetra-n-propylammonium compounds are preferred. Especially, a tetra-n-propylammonium hydroxide and a tetra-n-propylammonium bromide are preferred. More preferably, a tetra-n-propylammonium bromide is used in the present invention.

The lower alkylamine to be used in the above-described activation treatment may be a monoalkyl amine, may be a dialkylamine or may be a trialkylamine. Two or more of these alkylamines can be used together, if necessary. Preferably, a lower alkylamine represented by chemical formula (1) below are used:

$$NR^1R^2R^3 \qquad (1)$$

wherein $R^1$, $R^2$ and $R^3$ each are independently a hydrogen atom, or an alkyl group having 1 to 4 carbon atoms, and all of $R^1$, $R^2$ and $R^3$ are not hydrogen atoms at the same time.

Examples of lower alkylamines represented by chemical formula (1) above include a monomethylamine, a monoethylamine, a monopropylamine, a monobutylamine, a dimethylamine, a diethylamine, a dipropylamine, a dibutylamine, a trimethylamine, a triethylamine, a tripropylamine and a tributylamine. Among them, a tripropylamine is preferred.

An aqueous solution containing an ammonia and at least one compound selected from the group consisting of quaternary ammonium compounds and lower alkylamines may has a pH of about 9 or higher, preferably has a pH of from about 10 to about 13. The concentration of ammonia in the aqueous solution may be in the range of from about 2% by weight to about 30% by weight, and is preferably in the range of from about 5% by weight to about 25% by weight.

The content of a quaternary ammonium compound and/or a lower alkyl amine may be in the range of from about $1.0 \times 10^{-7}$ mol to about 1 mol, and is preferably in the range of from about $1.0 \times 10^{-6}$ mol to about 0.1 mol, based on one (1) mol of ammonia to be used together. When a zeolite is produced, the content may be in the range of from about $1.0 \times 10^{-7}$ mol to about 1 mol, and is preferably in the range of from about $1.0 \times 10^{-6}$ mol to about 0.1 mol, and is more preferably in the range of from about $1.0 \times 10^{-6}$ mol to about $1.0 \times 10^{-4}$ mol, and is most preferably in the range of from about $1.0 \times 10^{-6}$ mol to about $2.0 \times 10^{-5}$ mol, based on one (1) mol of ammonia to be used together. When a solid catalyst is activated, the content may be in the range of from about $1.0 \times 10^{-6}$ mol to about 1 mol, and is preferably in the range of from about $1.0 \times 10^{-5}$ mol to about 0.1 mol, and is more preferably in the range of from about $1.0 \times 10^{-5}$ mol to about 0.1 ml, based on one (1) mol of ammonia to be used together. The above-described aqueous solution containing an ammonia and a quaternary ammonium compound/lower alkylamine may further contain another component such as an ammonium salts ($NH_4^+$ salt), if necessary. Examples of the ammonium salt include an ammonium nitrate, an ammonium chloride, an ammonium sulfate and the like. Among them, an ammonium nitrate is preferred. When the aqueous solution contains an ammonium salt, the content of the ammonium salt may be in the range of from about 0.001 mol to about 1 mol, and is preferably in the range of from about 0.01 mol to about 0.1 mol, based on one (1) mol of ammonia to be used together.

In the present invention, the activation treatment is most preferably conducted using an aqueous solution containing the combination of an ammonia, a quaternary ammonium compound and an ammonium salt (such as an ammonium nitrate).

The activation treatment of a solid catalyst by the above-described aqueous solution may be carried out by a batch method or by a continuous method. For example, a solid catalyst (or the crystal obtained by hydrothermal synthesis reaction of silicon compound) may be immersed in the above-described aqueous solution in a vessel while stirring, or the above-described aqueous solution may be circulated through a tubular vessel which has been packed with a solid catalyst (or the crystal). The activation treatment with above-described aqueous solution may be conducted at a temperature of from about 50° C. to about 250° C., and is preferably at a temperature of from about 50° C. to about 200° C., and is more preferably at a temperature of from about 60° C. to about 150° C., for about 0.1 hour to about 10 hours The amount of the above-described aqueous solution to be used in the activation treatment may be in the range of from about 100 parts by weight to about 5,000 parts by weight, based on 100 parts by weight of the solid catalyst (or the crystal) to be treated. After the activation treatment, the solid catalyst (or the crystal) may be subjected to a subsequent treatment such as washing with water, drying, etc.

In the present invention, the Beckmann rearrangement reaction may be conducted in combination with a calcination treatment of the solid catalyst in the presence of an oxygen-containing gas such as an air, together with the above-described activation treatment. In the catalyst-calcination treatment, carbonaceous material deposited on the catalyst burns and removes from the catalyst, which results in allowing the catalyst to maintain a high conversion of cyclohexanone oxime and/or a high selectivity to ε-caprolactam. Preferably, the solid catalyst used in the Beckmann rearrangement reaction is subjected to the catalyst-calcination treatment prior to the above-mentioned activation treatment with the aqueous solution. The calcination treatment may be conducted in the presence of alcohol as in, for example, the method disclosed In Japanese Patent Application Laid-Open No. 3-207454.

Preferably, the catalyst-calcination treatment is conducted together with the Beckmann rearrangement reaction as follows;

When the Beckmann rearrangement reaction is carried out in a fixed bed, a cyclohexanone oxime, and if necessary, an alcohol, water, an inert gas, etc. are supplied into a fixed-bed reactor which has been packed with a solid catalyst to react them, then the supply of cyclohexanone oxime is stopped, and then an oxygen-containing gas is fed to the reactor to carryout calcining the catalyst, and such a reaction and calcination operation is repeatedly conducted. When the Beckmann rearrangement reaction is carried out in a fluidized-bed process, a portion of the solid catalyst for the reaction is continuously or intermittently taken out of the fluidized-bed reactor while supplying a cyclohexanone oxime and, if necessary, an alcohol, water, an inert gas, etc., and the solid catalyst taken out of the reactor is calcined and then is returned to the reactor As described above, when the Beckmann rearrangement reaction is performed in combination with catalyst-calcination treatment, the activation treatment of a solid catalyst with the above-described aqueous solution containing ammonia and the like is preferably conducted after the catalyst-calcination treatment. For example, when the reaction (by supplying a raw material gas to a fixed-bed reactor with a solid catalyst) and the catalyst calcination (by supplying an oxygen-containing gas to the fixed-bed reactor) are both conducted repeatedly as mentioned above, the activation treatment of a solid catalyst with the aqueous solution may be carried out every time or every several times after the calcination treatment. At this time, the activation treatment with the aqueous solution may be performed with the catalyst packed in the reactor. Alternatively, the activation treatment with the aqueous solution may be performed after the catalyst is taken out of the reactor, and then the catalyst are introduced to the reactor. In addition, when the reaction is conducted while circulating a catalyst between a fluidized-bed reactor and a calcination device (as mentioned above), the activation treatment with the aqueous solution may be performed after taking a portion of the catalysts out of the calcination device. The catalyst after the activation treatment with the aqueous solution may be returned to the calcination device again, or may be introduced into the reactor.

As described above, the activated catalyst in the present invention is reusable for the Beckmann rearrangement reaction of cyclohexanone oxime in a gas phase. That is, in accordance with the present invention, an activated catalyst having an excellent activity can also be obtained from a catalyst used in the production of ε-caprolactam. Also, in accordance with the present invention, a zeolite having a high catalyst activity and a long lifetime is produced. In the present invention, by using the thus obtained zeolite and/or the thus activated solid catalyst, an ε-caprolactam is produced In a high yield over the long period of time.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2002-51033 filed on Feb. 27, 2002 and the Japanese Patent Application No. 2002-181098 filed on Jun. 21, 2002, both indicating specification, claims and summary, are incorporated herein by reference in their entirety.

EXAMPLES

The present invention is described in more detail by reference to the following Examples, which should not be construed as a limitation upon the scope of the present invention.

Space velocity WHSV ($h^{-1}$) of cyclohexanone oxime was calculated by dividing a supply rate (g/h) of cyclohexanone oxime by the amount (g) of the utilized catalyst. A cyclohexanone oxime and an ε-caprolactam were analized by gas chromatography. Conversion of cyclohexanone oxime and selectivity to ε-caprolactam were calculated by means of the following equations, respectively:

$$\text{Conversion (\%) of cyclohexanone oxime} = [(X-Y)/X] \times 100$$

$$\text{Selectivity (\%) to ε-caprolactam} = [Z/(X-Y)] \times 100$$

wherein X is the molar amount of supplied cyclohexanone oxime, Y is the molar amount of unreacted cyclohexanone oxime, and Z is the molar amount of generated ε-caprolactam.

Reference Example 1

(a) Gas-Phase Beckmann Rearrangement Reaction:

A particulate catalyst having a particle diameter of 0.3 mm or less and mainly containing MFI zeolite composed of crystalline silica was circulated in a fluidized-bed reactor. A reaction was performed at 380° C. for 3 months by supplying into the reactor a vaporized cyclohexanone oxime, a vaporized methanol and a nitrogen gas while removing a reaction gas. During the reaction, space velocity WHSV of the cyclohexanone oxime was set to be 2 $h^{-1}$, the supply ratio of methanol was set to be 1.8 kg based on one (1) kg of cyclohexanone oxime, and the supply ratio of nitrogen gas was set to be 0.3 $m^3$ based on one (1) kg of cyclohexanone oxime. Also, during the reaction, a portion of the catalyst was removed from the reactor, was introduced into a calcination device and was calcined in an air flow at a temperature of 500° C. under the condition of an average residence time of 20 hours. After the calcination, the catalyst was introduced into the reactor again and was circulated between the reactor and the calcination device.

(b) Evaluation of Catalyst:

Into a quartz glass tube reactor with an inside diameter of 1 cm, was packed 0.375 g of the above-obtained catalyst to form a catalyst layer, which was preheat-treated at a temperature of 350° C. for one (1) hour in a nitrogen flow of 4.2 L/h. Then, the catalyst layer temperature was decreased to 340° C. in a nitrogen flow of 4.2 L/h.

Beckmann rearrangement reaction of cyclohexanone oxime was performed for 20.25 hours by supplying a vaporized mixture of cyclohexanone oxime and methanol (weight ratio: cyclohexanone oxime/methanol=1/1.8,) into the tube reactor at a supply rate of 8.4 g/h (WHSV of cyclohexanone oxime: 8 $h^{-1}$). Portions of the resulting reaction gas were collected at the passage of time of from 0 to 0.25 hour, of from 5 to 5.25 hour, of from 13 to 13.25 hour and of from 20 to 20.25 hours after the initiation of the reaction, respectively, and were analyzed by gas chromatography to determine conversion of cyclohexanone oxime and selectivity to ε-caprolactam. The results are shown in Table 1.

TABLE 1

| Passage of time (h) | 0–0.25 | 5–5.25 | 13–13.25 | 20–20.25 |
|---|---|---|---|---|
| Conversion (%) | 91.2 | 47.3 | 32.4 | 27.4 |
| Selectivity (%) | 91.5 | 94.4 | 93.9 | 93.5 |

Example 1

The catalyst (26 g) obtained after the reaction in Reference Example 1-(a) was placed in an autoclave, to which a mixture solution (pH: 11.5) of an ammonium nitrate aqueous solution (7.5% by weight, 110 g), an ammonia solution (25% by weight, 168 g) and a tetra-n-propylammonium bromide (1.91 g) was added. Then, the resulting mixture was agitated at a temperature of 90° C. for one (1) hour to activate the catalyst therein. After the filtration, the filtrated residue solid was washed with water and was dried to obtain an activated catalyst.

Using the activated catalyst, the Beckmann rearrangement reaction of cyclohexanone oxime was conducted (not for 20.25 hours, but for 10.25 hours) in the same manner as in Reference Example 1-(b).

After the above reaction, the supply of the mixture of cyclohexanone oxime and methanol was stopped, the nitrogen was switched to an air. Then, the temperature of the catalyst layer was increased from 340° C. to 410° C. in an air flow of 5 L/h and was maintained at a temperature of 410° C. for 20 hours, to conduct calcination treatment of the catalyst. Thereafter, the air was switched to a nitrogen, and the temperature of the catalyst layer was adjusted to 340° C. in a nitrogen flow of 4.2 L/h.

A series of operations from the reaction to the calcination treatment was further repeated 9 times, and totally the reaction was conducted 10 times. In the first, the second and the tenth reactions, portions of reaction gas were collected for the passage of time of from 10 to 10.25 hours after the initiation of reaction, respectively, and were analyzed by gas chromatography to determine conversion of cyclohexanone oxime and selectivity to ε-caprolactam. The results are shown in Table 2.

Example 2

An ε-caprolactam was produced in the same manner as in Example 1 except that a tri-n-propyl amine (0.10 g) was used instead of using the tetra-n-propylammonium bromide (1.91 g). The results are shown in Table 2.

Comparative Example 1

An ε-caprolactam was produced in the same manner as in Example 1 except that no tetra-n-propylammonium bromide was used. The results are shown in Table 2.

Reference Example 2

Using a brand-new catalyst (being the same type of catalyst mainly containing a component MFI zeolite composed of crystalline silica as used in Reference Example 1-(a)), the same ten-time reactions for producing an ε-caprolactam as in Example 1 was conducted, to obtain an E-caprolactam. The results are shown in Table 2.

TABLE 2

| | | Example 1 | Example 2 | Comparative Example 1 | Reference Example 2 |
|---|---|---|---|---|---|
| First Reaction (10–10.25 Hr) | Conversion (%) | 99.9 | 99.8 | 99.8 | 99.9 |
| | Selectivity (%) | 95.9 | 96.1 | 95.6 | 96.6 |
| Second Reaction (10–10.25 Hr) | Conversion (%) | 99.9 | 99.6 | 99.3 | 99.6 |
| | Selectivity (%) | 95.5 | 96.5 | 95.9 | 96.5 |
| Tenth Reaction (10–10.25 Hr) | Conversion (%) | 99.3 | 98.4 | 96.8 | 97.7 |
| | Selectivity (%) | 96.3 | 95.9 | 96.3 | 96.7 |

Example 3

(a) Production of Zeolite:

In a stainless steel autoclave, tetraethyl orthosilicate (Si(OC$_2$H$_5$)$_4$) (100 parts by weight), 40% aqueous tetra-n-propyl ammonium hydroxide solution (57.4 parts by weight), 48% aqueous potassium hydroxide solution (0.36 part by weight) and water (279 parts by weight) were placed and stirred vigorously for 120 minutes at a room temperature. The temperature in the autoclave was raised and was kept at 105° C. for 48 hours, to conduct hydrothermal synthesis reaction of the mixture under stirring. The resulting reaction mixture was filtered off, and the filtrated residue was washed continuously with de-ionized water until the pH of the filtrate reached about 9, to obtain crystals. The crystals were dried at 100° C. or higher.

The dried crystals were calcinated at 530° C. for 1 hour in a nitrogen stream, and then were calcinated at 530° C. for 1 hour in an air stream, to obtain powdery white crystals. As a result of powdery X-ray diffraction analysis, the crystals were identified to be a MIF zeolite. The powdery white crystals were then treated with a steam at 80° C. for 3 hours.

Thus steam-treated crystals (8.8 g) were placed in an autoclave. Further, a mixture (pH: 11.5) of an aqueous ammonium nitrate solution (7.5% by weight, 96 g), an ammonia water (25% by weight, 147 g) and a tetra-n-propylammonium bromide (0.003 g) was added to the autoclave. After stirring at 90° C. for 1 hour, the crystals were separated from the resulting mixture by filtration. After such treatment (with the mixture of aqueous ammonium nitrate solution, ammonia water and tetra-n-propylammonium bromide) and filtration were conducted repeatedly three times in total, the resulting crystals were washed with water and were dried. The catalyst thus obtained is referred to hereinafter as catalyst A.

(b) Production (1) of ε-Caprolactam:

Using catalyst A (0.375 g), the Beckmann rearrangement reaction of cyclohexanone oxime was conducted in the same manner as in Reference Example 1-(b), to obtain an ε-caprolactam. The results are shown in Table 3.

Example 4

(a) Production of Zeolite:

Steam-treated crystals (8.8 g) were obtained in the same manner as in Example 3-(a), which were then placed in an autoclave. Further, a mixture (pH: 11.5) of an aqueous ammonium nitrate solution (7.5 by weight, 96 g) and an ammonia water (25% by weight, 147 g) was added to the autoclave. After stirring at 90° C. for 1 hour, the crystals were separated from the resulting mixture by filtration. After such treatment (with the mixture of aqueous ammonium nitrate solution and ammonia water) and filtration were conducted repeatedly twice in total, the resulting crystals were then treated with a mixture (pH: 11.5) of an aqueous ammonium nitrate solution (7.5% by weight, 96 g), an ammonia water (25% by weight, 147 g) and a tetra-n-propylammonium bromide (0.008 g). After stirring at 90° C. for 2 hours, the crystals were separated from the resulting mixture by filtration, followed by being washed with water and being dried. The catalyst thus obtained is referred to hereinafter as catalyst B.

(b) Production (1) of ε-Caprolactam:

Using catalyst B (0.375 g), the Beckmann rearrangement reaction of cyclohexanone oxime was conducted in the same manner as in Reference Example 1-(b), to obtain an ε-caprolactam. The results are shown in Table 3.

(c) Production (2) of ε-Caprolactam:

An ε-caprolactam was produced in the sane procedures as in Example 1 except that catalyst B (0.375 g) was used instead of using the catalyst activated in Example 1.

A series of operations from the reaction to the calcination treatment was further repeated twice, totally the reaction was conducted 3 times. In the first, the second and the third reactions, portions of reaction gas were collected for the passage of time of from 10 to 10.25 hours after the initiation of reaction, respectively, and were analyzed by gas chromatography to determine conversion of cyclohexanone oxime and selectivity to ε-caprolactam. The results are shown in Table 4.

Comparative Example 2

(a) Production of Zeolite:

Steam-treated crystals (8.8 g) were obtained in the same manner as in Example 3-(a), which were then placed in an autoclave. Further, a mixture (pH: 11.5) of an aqueous ammonium nitrate solution (7.5% by weight, 96 g) and an ammonia water (25% by weight, 147 g) was added to the autoclave. After stirring at 90° C. for 1 hour, the crystals were separated from the resulting mixture by filtration. After such treatment (with the mixture of aqueous ammonium nitrate solution and ammonia water) and filtration were conducted repeatedly three times in total, the crystals were separated from the resulting mixture by filtration, followed by being washed with water and being dried. The catalyst thus obtained is referred to hereinafter as catalyst C.

(b) Production of ε-Caprolactam:

Using catalyst C (0.375 g), the Beckmann rearrangement reaction of cyclohexanone oxime was conducted in the same manner as in Example 3-(b), to obtain an E-caprolactam. The results are shown in Table 3.

(c) Production of ε-Caprolactam:

Using catalyst C (0.375 g), the Beckmann rearrangement reaction of cyclohexanone oxime was conducted in the same manner as in Example 4-(c), to obtain an c-caprolactam. The results are shown in Table 4.

TABLE 3

|  |  | Example 3 | Example 4 | Comparative Example 2 |
|---|---|---|---|---|
| 0–0.25 (Hr) | Conversion (%) | 100 | 100 | 100 |
|  | Selectivity (%) | 95.5 | 96.0 | 95.9 |
| 5–5.25 (Hr) | Conversion (%) | 100 | 100 | 99.8 |
|  | Selectivity (%) | 96.5 | 97.0 | 96.6 |

TABLE 3-continued

|  |  | Example 3 | Example 4 | Comparative Example 2 |
|---|---|---|---|---|
| 13–13.25 (Hr) | Conversion (%) | 99.9 | 100 | 99.5 |
|  | Selectivity (%) | 96.5 | 97.1 | 96.8 |
| 20–20.25 (Hr) | Conversion (%) | 99.9 | 99.9 | 99.1 |
|  | Selectivity (%) | 96.4 | 97.0 | 96.6 |

TABLE 4

|  |  | Example 4 | Comparative Example 2 |
|---|---|---|---|
| First Reaction (10–10.25 Hr) | Conversion (%) | 99.9 | 99.8 |
|  | Selectivity (%) | 96.1 | 96.6 |
| Second Reaction (10–10.25 Hr) | Conversion (%) | 99.9 | 99.6 |
|  | Selectivity (%) | 96.2 | 96.0 |
| Tenth Reaction (10–10.25 Hr) | Conversion (%) | 99.9 | 98.9 |
|  | Selectivity (%) | 96.4 | 96.2 |

What is claimed is:

1. A process for producing an ε-caprolactam, which comprises the steps of:
   (i) treating a solid catalyst with an aqueous solution containing an ammonia and at least one compound selected from the group consisting of a tetra-n-propylammonium compound and tri-n-propyl amine, and
   (ii) subjecting a cyclohexanone oxime to Beckmann rearrangement reaction in a gas phase in the presence of the treated solid catalyst.

2. A process according to claim 1, wherein the solid catalyst to be treated in step (i) is a zeolite.

3. A process according to claim 2, wherein the zeolite is a zeolite which is obtained by subjecting a silicon compound to hydrothermal synthesis reaction to obtain a crystal and calcining the crystal.

4. A process according to any one of claims 1–3, wherein the aqueous solution further contains an ammonium salt.

5. A process according to any one of claims 1–3, wherein the tetra-n-propylammonium compound is a tetra-n-propylammonium bromide.

6. A process according to claim 4, wherein the ammonium salt is an ammonium nitrate.

7. A process according to claim 1, wherein the solid catalyst to be treated in step (i) is a solid catalyst which has been used in step (ii).

8. A process for producing an ε-caprolactam, which comprises the steps of:
   subjecting a cyclohexanone oxime to Beckmann rearrangement reaction in a gas phase in the presence of a solid catalyst, to obtain a reaction mixture containing the solid catalyst;
   separating the solid catalyst from the reaction mixture;
   treating the separated solid catalyst with an aqueous solution containing an ammonia and at least one compound selected from the group consisting of a tetra-n-propylammonium compound and tri-n-propyl amine; and
   recycling the treated solid catalyst to the reaction step.

9. A process according to claim 8, wherein the separated solid catalyst is calcined prior to the treatment with the aqueous solution containing an ammonia and at least one compound selected from the group consisting of a tetra-n-propylammonium compound and tri-n-propyl amine.

10. A process according to claim 8, wherein said solid catalyst is a zeolite.

11. A process according to claim 2 or 10, wherein said zeolite is pentacil-type zeolite.

12. A process according to claim 11, wherein said pentacil-type zeolite is MFI zeolite.

13. A process according to any one of claims 1–3, wherein said tetra-n-propylammonium compound is a halide or a hydroxide thereof.

14. A process according to any one of claims 1–3, wherein said tetra-n-propylammonium compound is a tetra-n-propylammonium halide.

15. A process according to claim 1 or 8, further comprising the step of treating the solid catalyst with steam prior to the treatment with the aqueous solution.

16. A process according to claim 15, wherein said solid catalyst is a zeolite.

17. A process according to claim 16, wherein said zeolite is pentacil-type zeolite.

18. A process according to claim 17, wherein said pentacil-type zeolite is MFI zeolite.

19. A process according to claim 8, wherein said tetra-n-propylammonium compound is a halide or a hydroxide thereof.

20. A process according to claim 1 or 8, wherein said tetra-n-propylammonium compound is a tetra-n-propylammonium halide.

21. A process according to claim 5, wherein the aqueous solution further contains an ammonium salt.

22. A process according to claim 8, wherein the aqueous solution further contains an ammonium salt.

23. A process according to claim 21, wherein the ammonium salt is ammonium nitrate.

24. A process according to claim 22, wherein the ammonium salt is ammonium nitrate.

25. A process according to claim 14, wherein the aqueous solution further contains an ammonium salt.

26. A process according to claim 25, wherein the ammonium salt is ammonium nitrate.

* * * * *